March 8, 1932.  W. F. NEWHOUSE  1,848,431
MACHINERY FOR MAKING RECEPTACLES
Filed Aug. 2, 1929  7 Sheets-Sheet 1

Inventor
Walter F. Newhouse
By Arthur F. Durand
Atty.

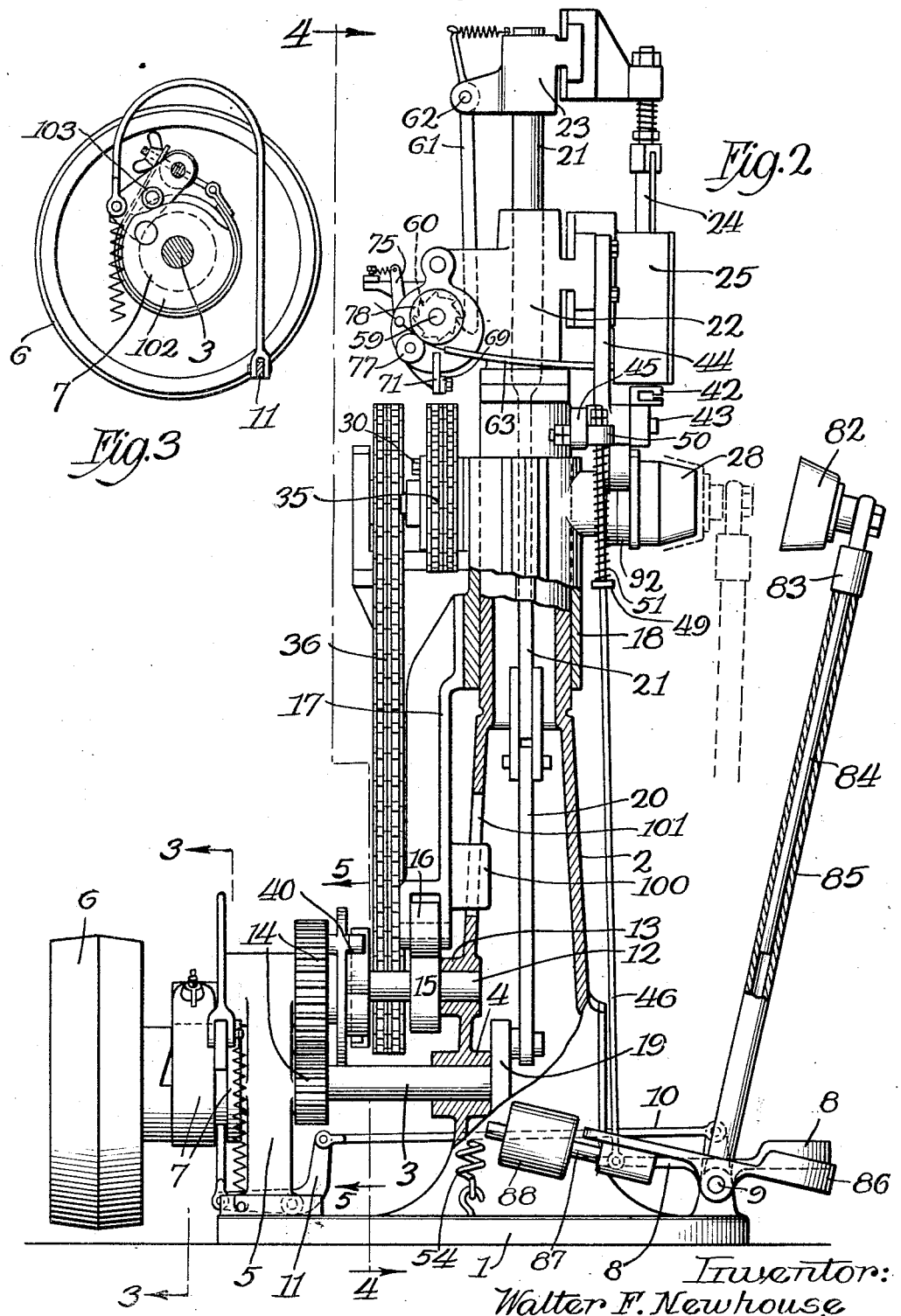

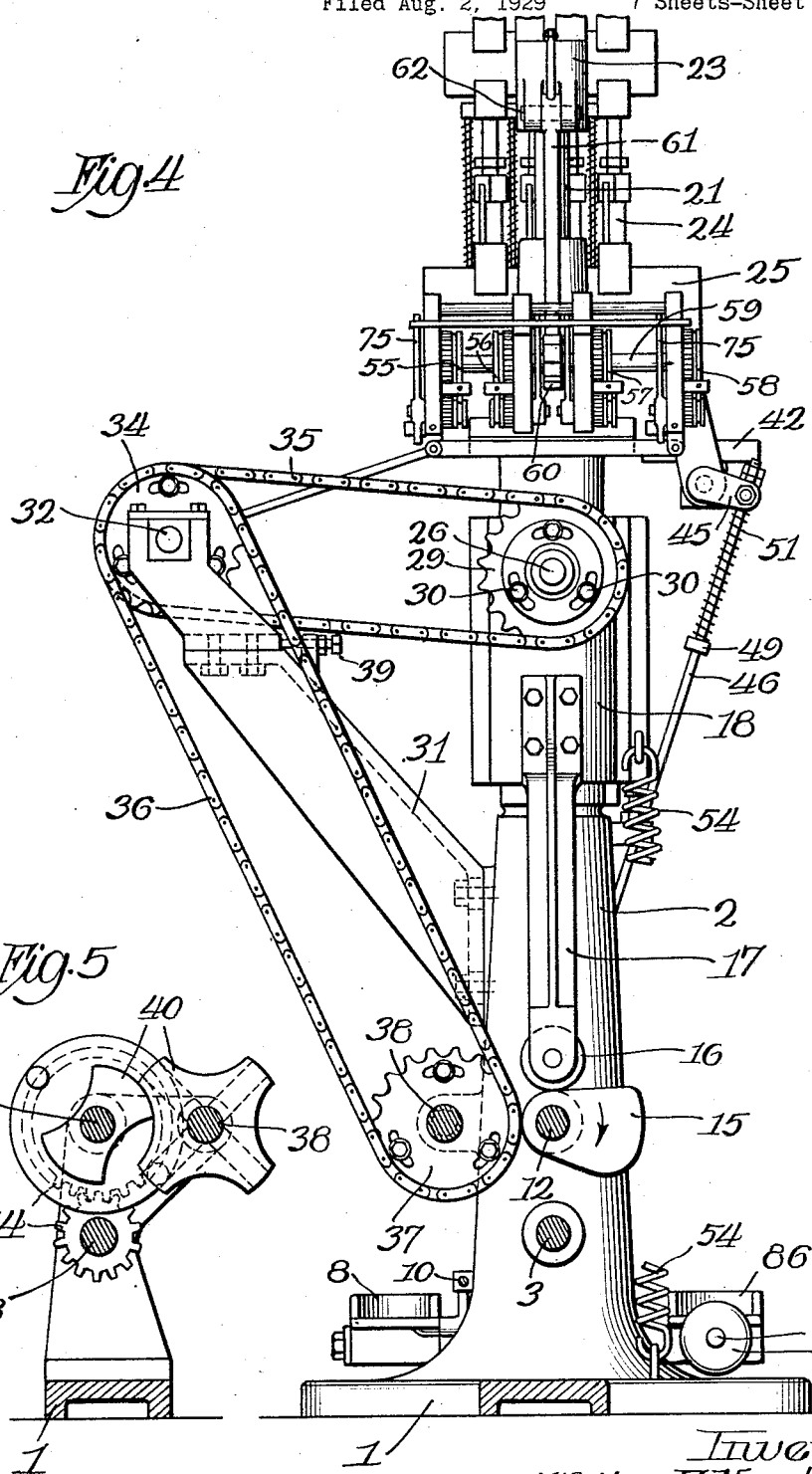

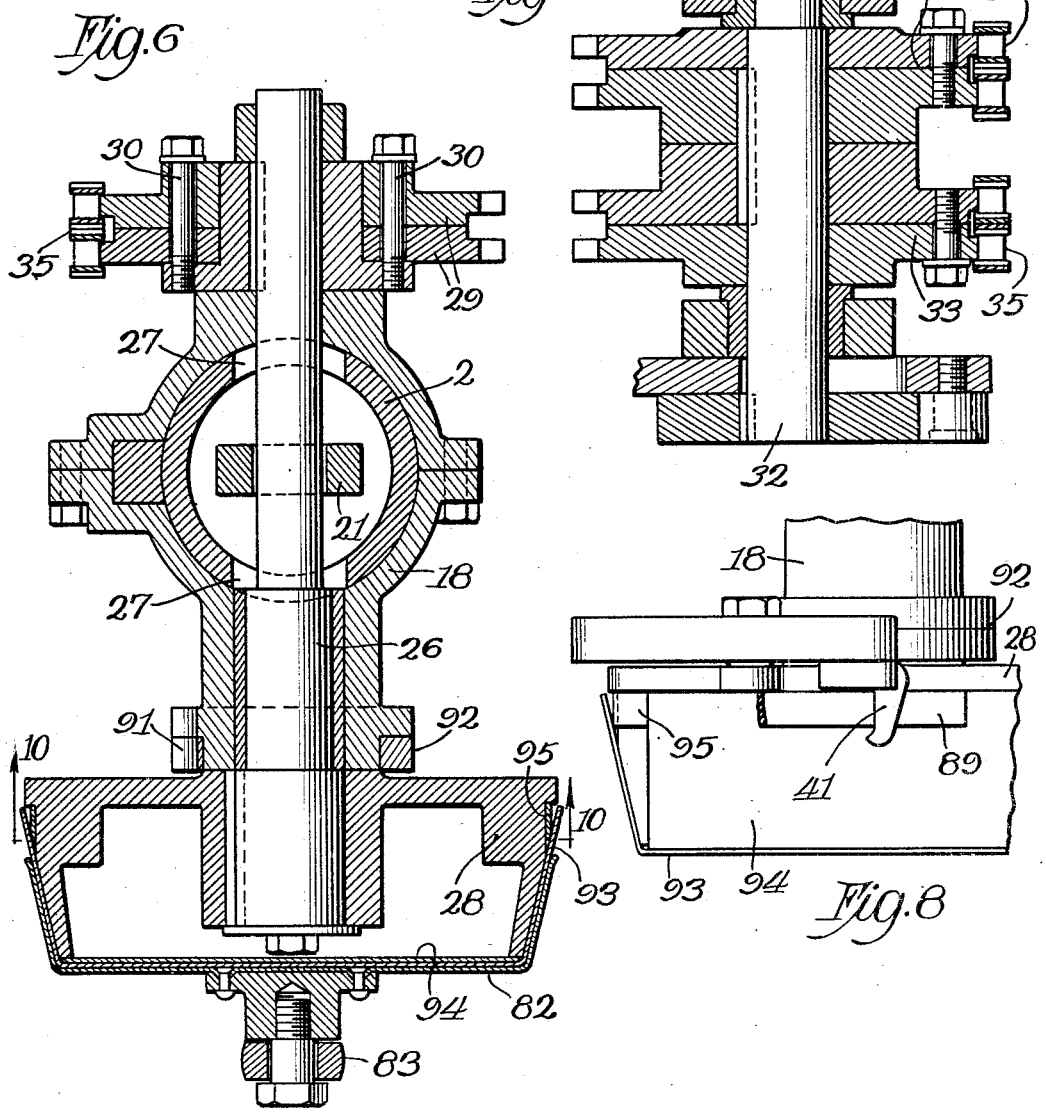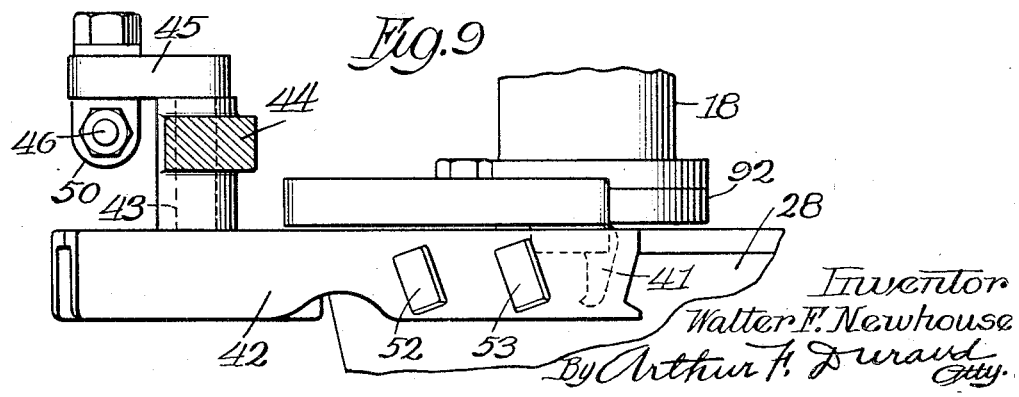

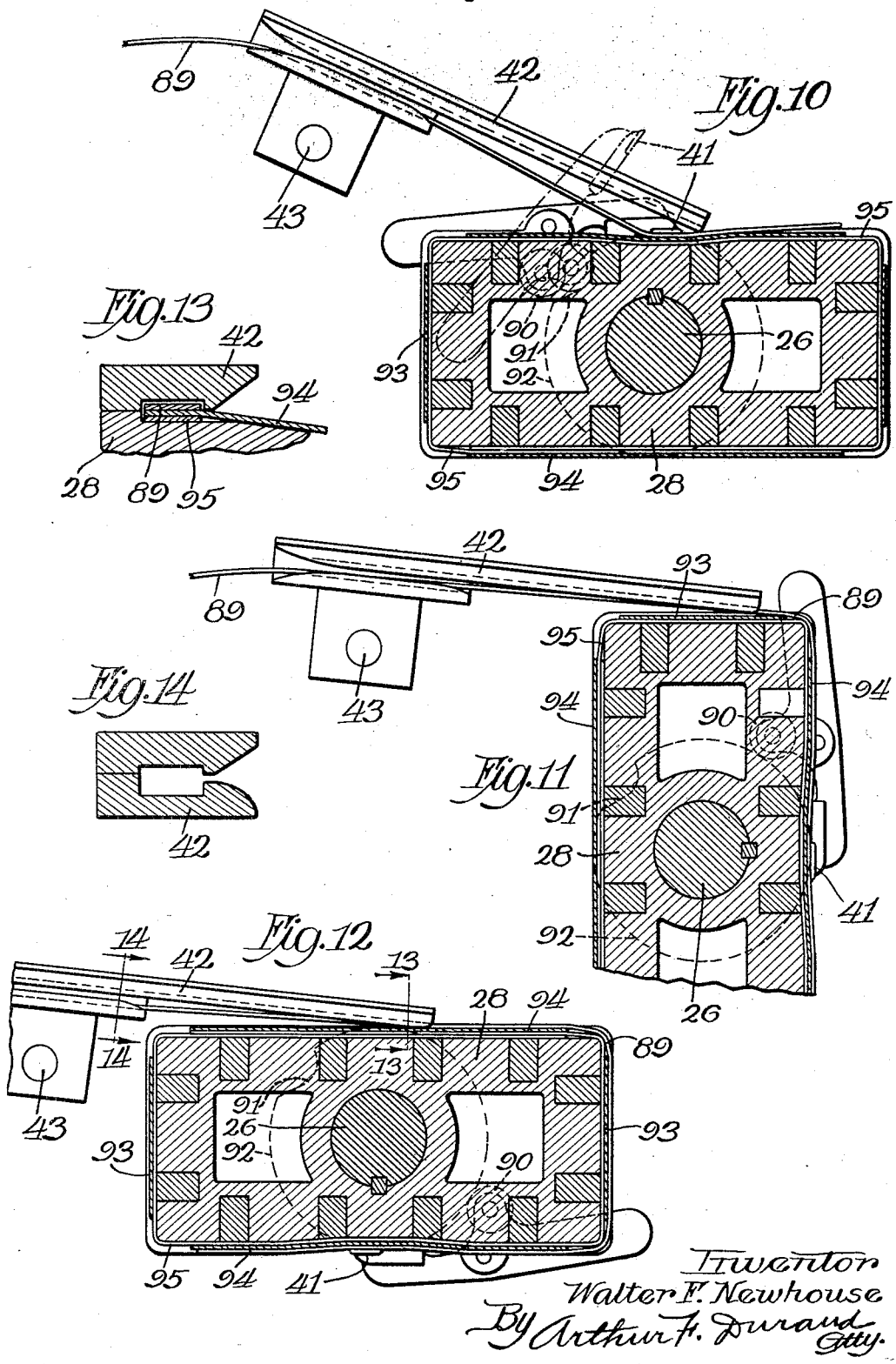

March 8, 1932.  W. F. NEWHOUSE  1,848,431
MACHINERY FOR MAKING RECEPTACLES
Filed Aug. 2, 1929  7 Sheets-Sheet 6
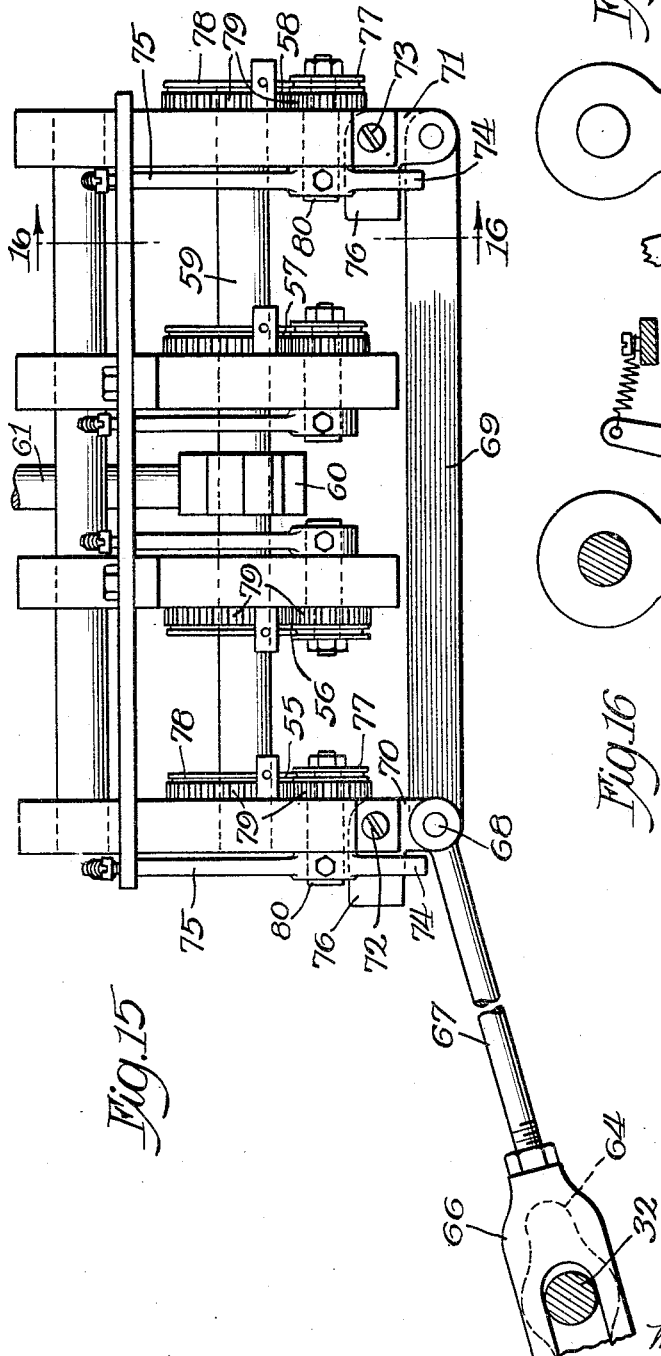
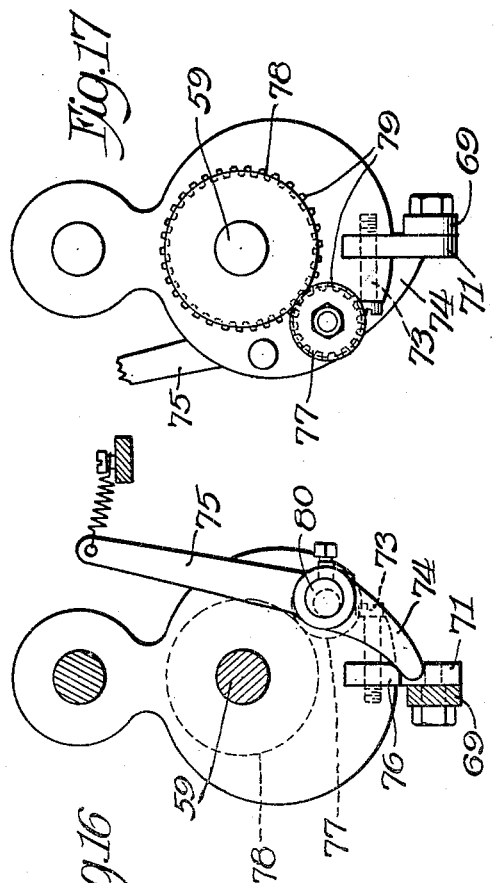
Inventor
Walter F. Newhouse
By Arthur F. Durand
Atty.

March 8, 1932.  W. F. NEWHOUSE  1,848,431
MACHINERY FOR MAKING RECEPTACLES
Filed Aug. 2, 1929   7 Sheets-Sheet 7
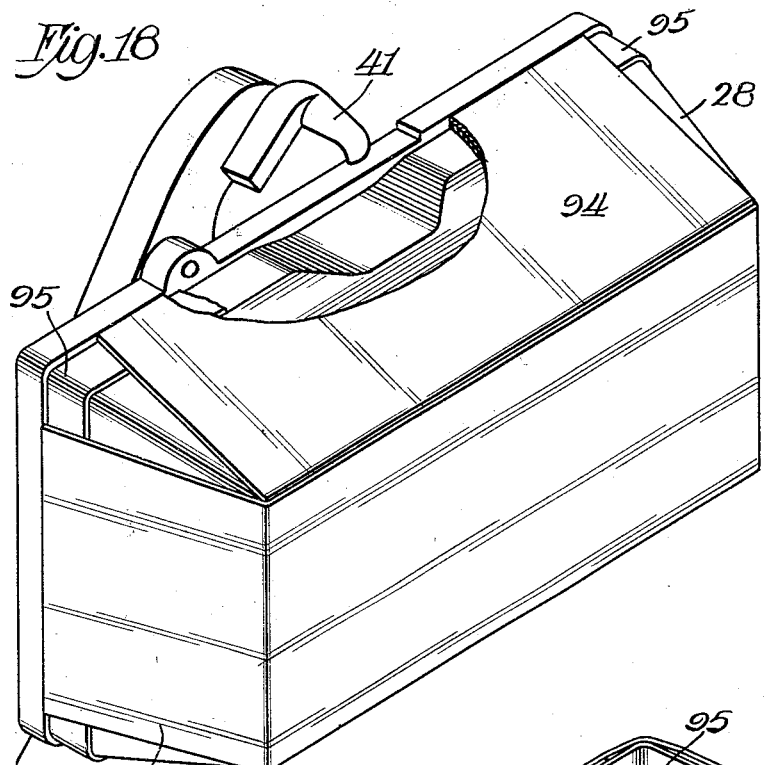
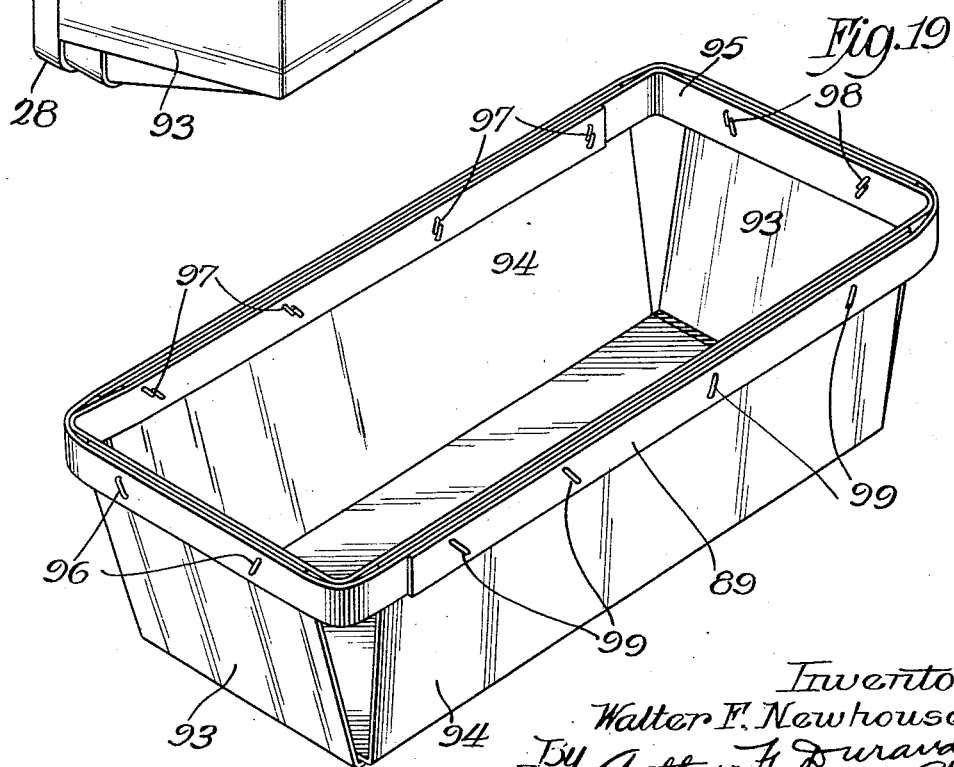
Inventor:
Walter F. Newhouse
By Arthur F. Durand
Atty.

Patented Mar. 8, 1932

1,848,431

UNITED STATES PATENT OFFICE

WALTER F. NEWHOUSE, OF BENTON HARBOR, MICHIGAN, ASSIGNOR TO SARANAC MACHINE COMPANY, OF BENTON HARBOR, MICHIGAN, A CORPORATION OF MICHIGAN

MACHINERY FOR MAKING RECEPTACLES

Application filed August 2, 1929. Serial No. 383,012.

This invention relates to machinery for making receptacles, and more particularly to machinery for making baskets from veneer or other sheet material, and more especially to the production of baskets which are rectangular and oblong, such as those in which grapes and other kinds of fruit are commonly shipped and sold.

Generally stated, the object of the invention is to provide a machine having a novel and improved construction whereby, on the production of an oblong rectangular basket, the staples on each side thereof are driven simultaneously, a certain number of staples for each end of the basket, and a larger number for each side of the basket, whereby the production of baskets of this kind may be speeded up to increase production and reduce the cost thereof.

Another object is to provide a novel and improved construction whereby the gang stapler mechanism is automatically controlled to insure the making and driving of a staple by each separate stapler each time the mechanism operates on one side of the basket, and whereby said mechanism is prevented from driving the full number of staples while operating on each end of the basket.

It is also an object to provide certain details and features of construction and combinations tending to increase the general efficiency and the desirability of a basket making machine of this particular character.

To the foregoing and other useful ends, the invention consists in the matters hereinafter set forth and claimed, and shown in the accompanying drawings, in which,—

Fig. 2 is a side elevation of said machine, with certain portions thereof shown in vertical section for convenience of illustration.

Fig. 3 is a detail vertical section on line 3—3 in Fig. 2.

Fig. 4 is a vertical section on line 4—4 in Fig. 2.

Fig. 5 is a vertical detail section on line 5—5 in Fig. 2.

Fig. 6 is an enlarged horizontal section on line 6—6 in Fig. 1.

Fig. 7 is an enlarged horizontal section on line 7—7 in Fig. 1.

Fig. 8 is a detail or fragmentary plan view of certain portions of the machine, with certain portions thereof shown broken away for convenience of illustration, said view being on the same scale as Figs. 6 and 7.

Fig. 9 is a fragmentary detail plan view of certain portions of the machine, showing certain portions broken away for convenience of illustration.

Fig. 10 is a vertical section on line 10—10 in Fig. 6, showing certain portions in elevation.

Fig. 11 is a view similar to Fig. 10, showing the parts in different positions, and showing a portion of the structure broken away for convenience of illustration.

Fig. 12 is a similar view, showing the parts in a still different position.

Fig. 13 is an enlarged detail section on line 13—13 in Fig. 12.

Fig. 14 is an enlarged detail section on line 14—14 in Fig. 12.

Fig. 15 is an enlarged rear elevation of certain portions of the machine shown in Fig. 4 of the drawings.

Fig. 16 is a vertical section on line 16—16 in Fig. 15.

Fig. 17 is a side elevation of the right-hand side of the structure shown in Fig. 15.

Fig. 18 is a perspective of the basket form with a partially formed basket thereon.

Fig. 19 is a perspective of one of the completed baskets produced on the machine shown and described.

Figure 1:
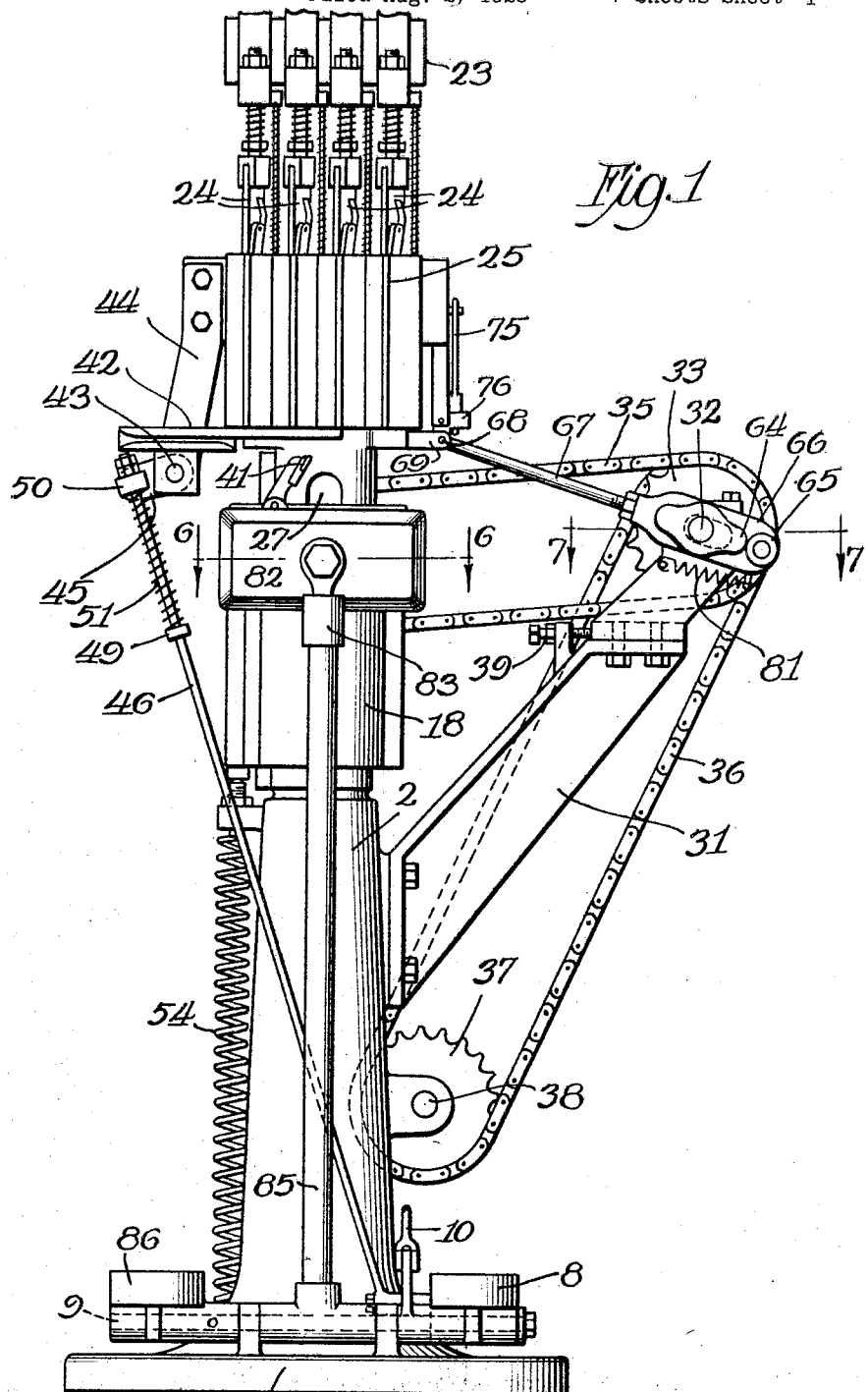
Fig. 1 is a front elevation of a basket making machine embodying the principles of the invention.

As thus illustrated, the invention comprises a base 1 having an upright integral portion 2 forming the main stationary body of the machine. The main drive shaft 3 is mounted to rotate in a bearing 4 formed in the said body, and in the bracket bearing 5 mounted on said base, as shown. The said shaft is operated by a driving pulley 6 through the medium of suitable clutch mechanism 7, of any suitable character, controlled by a foot pedal 8 loose on the rock shaft 9 through the medium of the rod 10 and the bell crank 11, in any suitable or desired manner. Clutches of this kind, for connecting and disconnecting the shaft 3 with the continuously rotating driving pulley 6, are common and well understood, and need no further description.

A short countershaft 12 is mounted to rotate in a bearing 13 formed in the main body, immediately above the shaft 3, and the shaft 12 is supported at its other end in the upper portion of the bracket 5 previously mentioned. The shafts 3 and 12 are geared together by the gearing 14, as shown, so that the shaft 3 rotates several times for each rotation of the shaft 12, in a manner that will be readily understood. The shaft 12 is provided with a cam 15 which engages a roller 16 on the lower end of the arm 17, which latter is rigid with the slide 18 that is mounted to slide up and down on the body portion 2 of the machine, said cam being shaped to time the up and down movement of the slide 18 in the desired manner, as will hereinafter more fully appear.

The shaft 3 is provided with a crank 19, inside the housing provided with the body of the machine, and this crank is connected by a link 20 with the lower end of the vertically reciprocating rod 21, which latter passes up through the stationary stapler head 22 rigidly mounted on top of the body 2, as shown. The upper end of this rod 21 is provided with the vertically reciprocating stapler head 23, which latter is provided with the usual or any form of stapler formers and drivers 24 that reciprocate up and down in the casing 25 of the stationary stapler head, whereby there are in effect four separate staplers suitably spaced apart, as shown in Fig. 1 of the drawings, thus providing a gang stapler mechanism capable of simultaneously making and driving four staples. The details of staplers of this kind are well known and well understood, and need no further description or explanation.

The slide 18 is provided with a horizontal shaft 26 that is movable up and down in the slots 27 formed in the stationary body of the machine, when the slide 18 is moved up and down. The shaft 26 is provided at its front end with a basket form 28 of a shape to form and co-operate in the making of a rectangular oblong basket of the kind shown in Fig. 19 of the drawings. This basket form is mounted rigidly on the shaft 26, but is removable therefrom by any suitable or desired means. The rear end of the shaft 26 is provided with a double sprocket wheel 29, the two sections of which are relatively adjustable, rotatively, by means of the connecting bolts 30, the two sections thus forming in effect a sprocket wheel composed of two halves which are susceptible of adjustment relatively to each other about their common axis, this double sprocket wheel being keyed on the shaft. A bracket arm 31 is secured to the side of the body 2 of the machine, as shown in Figs. 1 and 4, and the outer end of this arm is provided with bearings for the short horizontal shaft 32, upon which are keyed the two double sprocket wheels 33 and 34, these sprocket wheels being similar to the one described in connection with Fig. 6 of the drawings. The sprocket wheel 33 is connected by a double sprocket chain 35 with the double sprocket wheel 29, while the sprocket wheel 34 is connected by a similar sprocket chain or belt 36 with the sprocket wheel 37 on the shaft 38, which latter is mounted in suitable bearings on the main body frame. By relatively adjusting the halves of any one of said double sprocket wheels, slack can be taken up in the sprocket chains or belts, and the transmission can be accurately adjusted to time the rotation of the basket form 28 previously mentioned. Also, the bearings for the shaft 32 are adjustable by means of adjusting screws 39, on the upper end of the arm 31, in a manner that will be readily understood, thereby to take up slack in the sprocket chains or belts.

The transmission of power from the shaft 12 to the shaft 38 is through the medium of the Geneva movement 40, as shown in Figs. 2 and 5, whereby the continuous rotation of the shaft 12 is converted into intermittent motion on the part of the shaft 28, whereby the rotation of the basket form 28 is intermittent in character, each complete rotation of this basket form being composed of four successive and partial rotations of the form, whereby each partial rotation places the basket form in position to co-operate with the previously mentioned gang stapler mechanism, as will hereinafter more fully appear. Said basket form is provided with a pivoted hoop-strip clamp 41, for a purpose that will hereinafter more fully appear.

The said gang stapler mechanism is provided with a hoop-strip guide 42 that is pivoted at 43 on the stationary bracket arm 44 secured to one side of the stapler mechanism. The bell crank arm 45 is rigid with said guide 42, and is connected by a rod 46 with the inner end of the foot pedal lever 8, the outer end of which, when depressed, causes a downward tilting movement of the inner end portion of the guide 42 previously mentioned. The rod 46 preferably has a rigid shoulder 49, and the bell crank arm 45 has a swiveled guide 50 through which the said rod extends and is free to reciprocate, there being a coiled spring 51 interposed between the shoulder 49 and the outer portion of the said swivel 50, whereby the spring 51 is adapted to be compressed when the rod 46 is pushed upward by its pedal lever, thereby communicating a yielding pressure to the guide 42, permitting the latter to have some movement while the rod 46 remains stationary in raised position. The guide 42 preferably has two openings 52 and 53 through which two of the staples are driven into the basket, as will hereinafter more fully appear.

A coiled spring 54 preferably connects the slide 18 with the base 1, as shown, thereby pulling the slide 18 downward promptly when it is necessary to lower the basket form, and keeping the roller 16 in constant engagement with the cam 15 previously mentioned.

At the back of the stapler head 22, four wires are fed to the four staplers, for the making of the staples, by the four feed devices 55, 56, 57 and 58, shown in Fig. 15 of the drawings, these feed devices all being mounted on the intermittently rotated shaft 59 carried in suitable bearings on the rear of the stationary stapler head, which shaft is intermittently rotated by the ratchet wheel 60 and ratchet pawl 61, the latter being pivoted at 62 on the vertically reciprocating stapler head 23 previously mentioned. Therefore, each time the stapler head 23 moves upward, the shaft 59 is given a partial rotation, whereby the feed rolls feed the wire forward each time the stapler head 23 moves upward after driving a set of staples, there being a tube 63 for each wire feed device, through which tubes the four wires are fed to their respective staplers.

As the wire feed devices 55 and 58 have to be cut out or automatically controlled, at different times, in order to prevent the feeding of the wire by these two devices, these two devices are subject to automatic control by a cam 64 on the shaft 32 previously mentioned. For this purpose, said cam is arranged to engage a roller 65 on the slotted reciprocating member 66, which is rigid with the rod 67, the latter being pivoted at 68 on the horizontal bar 69 disposed below the wire feed devices, as shown in Fig. 15 of the drawings. This bar is hung on the bell cranks 70 and 71, which are in turn pivoted at 72 and 73 on the frame of the machine. These bell cranks are disposed in position to engage the lower end portions 74 of the eccentric arm adjuster 75 of each of the two feed devices 55 and 58, whereby when the bar 69 is moved to the right in Fig. 15, so that the arms 76 of the two bell cranks are moved downward, the lower idler roll 77 of each feed device 55 and 58 is moved away from the actuated upper and larger roll 78 of each of said feed devices, thus releasing the wire and preventing the feeding thereof. The two rolls, of course (the same is true of each of the four wire feed devices shown and described), are geared together by the gearing 79, in a manner that is common in feed devices of this kind, and the eccentric mounting 80 of each lower feed roll is of such character that when the arm 75 is rocked, the two feed rolls separate slightly and release the wire without throwing the two gears out of mesh. A coiled spring 81 is connected between the member 66 and a stationary part of the general machine frame, in order to keep the roller 65 in constant engagement with the cam 64 previously mentioned. Thus, whenever the bar 69 is actuated, and the arms 75 are rocked, the two outer feed devices 55 and 58 are rendered inoperative to feed the wire, and consequently at such time no staples will be formed in the two outside staplers, and only the two middle staplers of the four-stapler gang will be operative to make and drive staples.

The basket mold or clamp 82 is shaped to conform to the external shape and size of the basket form 28, and is suitably mounted to rotate on the upper end of the support 83, which latter is mounted on a rod 84 and telescopes in the tube 85, the lower end of which latter is fixed on the rock shaft 9 previously mentioned. The shaft 9 is rocked by a foot pedal 86 which is rigid with an arm 87 on which is mounted a weight 88 which is heavy enough to tilt the basket mold 82 toward the basket form 28, in order to clamp the basket materials upon the form, and during the step-by-step or intermittent rotation of the basket form, with the basket materials thereon, the basket mold 82 is free to rotate therewith until the staples are all driven, and then the basket mold 82 can be pulled outward by hand to release the finished basket. The rod 84 can slide up and down in the tube 85 to permit the mold 82 to move up and down with the basket form 28, the latter having this up and down movement, necessarily, because of the oblong form of the basket, the ends of the basket and the basket form being necessarily farther away from the axis of rotation, whereby the basket form and basket mold must move upward each time one side of the basket is stapled immediately after the stapling of one end thereof.

The hoop-strip clamp 41 can be operative, in any suitable or desired manner, to grip the hoop strip 89, but preferably this clamp is provided with a roller 90 which engages the notch 91 in the cam 92 on the slide 18, when the clamp is in the dotted-line position shown in Fig. 10 of the drawings; but which occupies the full-line position as soon as the basket form is rotated to bring the roller 90 into engagement with the peripheral edge of this cam 92, thus holding the clamp 41 in clamping position, and causing it to firmly grip the end portion of the hoop strip 89 against the outer surface of the top portion of the basket side-wall material. The depression of the treadle 48 will cause the guide 42 to move into the position shown in Fig. 10 of the drawings, after the hoop strip is inserted, causing the clamp 41 to clamp the hoop strip 89, temporarily, so to speak, until the basket form is rotated sufficiently to bring the roller 90 out of engagement with the notch 91 in the cam 92, after which the said roller and cam are co-operatively effective to retain the clamping grip on the hoop strip, thus pulling the hoop strip through the guide and winding it around the basket, by the intermittent rotation of the basket form, and receiving the successive staples from the gang stapler mechanism.

Fig. 19 shows the oblong rectangular form of a basket made on this machine, said basket comprising the two strips of creased or scored veneer 93 and 94, the former for the ends of the basket, and the latter for the relatively long sides of the basket, and, of course, the bottom sections of these two strips of veneer combine to form a two-ply bottom for the basket. In practice, the preformed inner top hoop 95 is first placed on the basket form, and the strips of veneer are then placed in position, as shown in Fig. 18, and the basket clamp or mold 82 is then allowed to move forward to clamp the materials in place. The long hoop strip 89 is then inserted, as shown and described. After that the machine is controlled to drive the two staples 96 in one end of the basket, through the two hoops and the sheets of veneer; after that the four staples 97 are driven; thereafter the two staples 98 are driven in the other end of the basket; and then, finally, the four staples 99 are driven in the other long side of the basket opposite the staples 97 previously mentioned. The finished basket is then released, by pulling the clamp or mold 82 outward, and fresh materials are inserted, and the operation is repeated for the production of each succeeding basket. Thus, when the staples 99 and 97 are driven, all four separate staplers of the gang stapler mechanism are operated; but when the staples 96 or 98 are driven, only the two middle staplers are operative to make and drive staples, the two outer staplers having been rendered inoperative by the automatic control of the two outer wire feed devices, in the manner previously described. In this way, the two outer staplers of the stapler gang are rendered inoperative twice in the making of each basket, it being understood that the various described parts are so timed in their operation, relatively to each other, that the basket materials are automatically rotated and stapled in the described manner, in order to produce the rectangular oblong basket shown in Fig. 19 of the drawings.

Obviously, the clutch pedal 8 is operated once for each basket, so that the normal condition of the machine is with the clutch open, so that the machine is not running; but the machine continues to operate as long as the clutch pedal is held down. The hoop guide 42 is also operated once for each basket, simultaneously with the operation of the clutch pedal 8, whereby the previously inserted hoop strip is clamped when the machine is started, so that no rotation of the basket form occurs until after the hoop strip is firmly clamped and gripped at its end portion, as previously explained. The foot pedal 8 and the hoop guide 42 are maintained in a depressed position by a cam 102 mounted on the clutch 7, as shown. The cam 102 operates on roller 103 and the associated connections, 10 and 11, to maintain said foot pedal 8 and said hoop guide 42 in lowered position during the greater portion of rotation of the form 28, when the machine is in operation. After the hoop strip is firmly gripped, the basket form rotates into the position shown in Fig. 11, thereafter into the position shown in Fig. 12, and the third position is the same as Fig. 11, except that the opposite end of the basket form and basket are upward; and, finally, the fourth position of the basket form and basket is the same as Fig. 10 of the drawings, except that in this fourth position the basket form is raised by the cam 15 to receive the final staples, it being understood that no staples are driven when the basket form and basket are in the position shown in Fig. 10 of the drawings, and that Fig. 11 shows the first staple receiving position of the basket form.

Preferably, the bar 17 is provided with an inside projection 100 which reciprocates up and down in the slot 101 formed in the body 2 of the machine, this slot 101 serving as a guide to relieve lateral strain on the bar 17, whereby the latter is firmly guided up and down.

What I claim as my invention is:

1. A machine for making a receptacle or container having sides of different sizes, comprising a multiple stapler head forming a gang stapler mechanism, power operated instrumentalities for automatically presenting the container sides successively to said mechanism, by motion of the container about an axis that moves or shifts relatively to the stapler head, means for operating said mechanism to simultaneously drive the maximum number of staples into a relatively large side, and automatic devices for rendering one or more staplers of said gang inoperative to drive staples in a smaller side.

2. A structure as specified in claim 1, said devices being automatically controlled by the operation of said instrumentalities.

3. A structure as specified in claim 1, said instrumentalities comprising a rotary support for said receptacle or container, adapted to rotate below said mechanism.

4. A structure as specified in claim 1, said instrumentalities comprising a rotary receptacle form below said mechanism, and automatic means whereby said form is moved up and down to present each side of the container in one and the same level or plane in which the staples are all driven.

5. A structure as specified in claim 1, said instrumentalities comprising a rotary inside form to support the container, and an outside form serving as a clamp to hold the container materials in position to be fastened together by the staples, said outside form being rotatable by and with the inside form.

6. A structure as specified in claim 1, said instrumentalities comprising a rotary form which is also movable up and down, said form having a portion thereof adapted to receive a preformed inside hoop for the container, in combination with means to feed an outside hoop strip by the rotation of said form, in the plane of the preformed hoop, said form having a clamp to grip the end portion of the outside hoop strip.

7. A structure as specified in claim 1, said mechanism having a staple wire feeding means for each stapler of the gang, and said devices comprising means for rendering one or more of said feeding means inoperative whenever a smaller side of the container is presented to said mechanism.

8. A structure as specified in claim 1, said instrumentalities comprising a rotary basket form, and comprising also power-transmitting connections for the giving of said form an intermittent or step-by-step rotation below said mechanism, and automatic means for moving said basket form up and down to successively present the different sides thereof in operative relation to said mechanism.

9. A structure as specified in claim 1, said instrumentalities comprising a rotary basket form and power-transmitting connections for intermittently rotating said form, said power-transmitting connections comprising a double sprocket wheel the halves of which are relatively adjustable about the axis of the wheel, and a double sprocket chain for engaging the halves of said double sprocket wheel.

10. A structure as specified in claim 1, said instrumentalities comprising a rotary basket form, a sprocket chain connection for rotating said basket form, and an intermittent motion device for operating said sprocket chain connection.

11. A structure as specified in claim 1, said instrumentalities comprising a rotary basket form below said mechanism, said basket form having a clamp thereon to grip the end portion of an outside basket hoop strip, a hoop-strip guide pivoted adjacent said mechanism, in position to feed a hoop strip into position to be gripped by said clamp, and means for tilting said guide downward to engage the clamp and thereby cause the initial clamping of the hoop strip, together with means acting thereafter to hold said clamp in gripping position during the rotation of the basket form.

12. A structure as specified in claim 1, said instrumentalities comprising a rotary basket form, a vertically reciprocating slide on which said basket form is mounted to rotate, and power-transmitting connections for rotating said basket form and adapted for accommodation to the up and down motion of said slide and basket form.

13. In a stapling machine, the combination of a gang stapler mechanism comprising a plurality of individual staplers operative in unison, disposed in a row, instrumentalities for supporting the work in position to move below said mechanism, by motion of said instrumentalities in the plane of said row, means for operating said mechanism, about an axis that moves or shifts relatively to the stapler, and devices automatically operated in the operation of said instrumentalities to automatically render one or more of said staplers inoperative to drive staples for certain portions of the work.

14. A structure as specified in claim 13, said instrumentalities comprising a rotary basket form mounted in position to rotate below said mechanism about an axis extending at right angles to said plane.

15. A structure as specified in claim 13, said instrumentalities comprising a rotary basket form mounted in position to rotate below said mechanism about an axis extending at right angles to said plane, together with means for moving said basket form up and down, said form being oblong and rectangular in shape, thereby necessitating said up and down movement in order to present each side of the basket in proper position to receive the staples.

16. A structure as specified in claim 13, said automatic devices comprising a wire feeding means for each individual stapler, means including a shaft extending parallel with said plane to operate said feeding means in unison, one or more of said wire feeding means being subject to said automatic control to govern the number of staples driven simultaneously by each stroke of said mechanism.

17. A structure as specified in claim 13, including provisions whereby the work is movable up and down in said plane to properly present different portions of the work to receive the staples.

18. A machine for making a receptacle or container having sides of different sizes, comprising a multiple stapler head forming a gang stapler mechanism, power operated instrumentalities for automatically presenting the container sides successively to said mechanism, means for operating said mechanism to simultaneously drive the maximum number of staples into a relatively large side, and automatic devices for rendering one or more staplers of said gang inoperative to drive staples in a smaller side, said instrumentalities comprising a rotary receptacle form below said mechanism, and automatic means whereby said form is moved up and down to present each side of the container in one and the same level or plane in which the staples are all driven.

19. A machine for making a receptacle or container having sides of different sizes, comprising a multiple stapler head forming a gang stapler mechanism, power operated instrumentalities for automatically presenting the container sides successively to said mechanism, means for operating said mechanism to simultaneously drive the maximum number of staplers into a relatively large side, and automatic devices for rendering one or more staplers of said gang inoperative to drive staples in a smaller side, said instrumentalities comprising a rotary inside form to support the container, and an outside form serving as a clamp to hold the container materials in position to be fastened together by the staples, said outside form being rotatable by and with the inside form.

20. A machine for making a receptacle or container having sides of different sizes, comprising a multiple stapler head forming a gang stapler mechanism, power operated instrumentalities for automatically presenting the container sides successively to said mechanism, means for operating said mechanism to simultaneously drive the maximum number of staples into a relatively large side, and automatic devices for rendering one or more staplers of said gang inoperative to drive staples in a smaller side, said instrumentalities comprising a rotary form which is also movable up and down, said form having a portion thereof adapted to receive a preformed inside hoop for the container, in combination with means to feed an outside hoop strip by the rotation of said form, in the plane of the preformed hoop, said form having a clamp to grip the end portion of the outside hoop strip.

21. A machine for making a receptacle or container having sides of different sizes, comprising a multiple stapler head forming a gang stapler mechanism, power operated instrumentalities for automatically presenting the container sides successively to said mechanism, means for operating said mechanism to simultaneously drive the maximum number of staples into a relatively large side, and automatic devices for rendering one or more staplers of said gang inoperative to drive staples in a smaller side, said instrumentalities comprising a rotary basket form, and comprising also power-transmitting connections for the giving of said form an intermittent or step-by-step rotation below said mechanism, and automatic means for moving said basket form up and down to successively present the different sides thereof in operative relation to said mechanism.

22. A machine for making a receptacle or container having sides of different sizes, comprising a multiple stapler head forming a gang stapler mechanism, power operated instrumentalities for automatically presenting the container sides successively to said mechanism, means for operating said mechanism to simultaneously drive the maximum number of staples into a relatively large side, and automatic devices for rendering one or more staplers of said gang inoperative to drive staples in a smaller side, said instrumentalities comprising a rotary basket form and power-transmitting connections for intermittently rotating said form, said power-transmitting connections comprising a double sprocket wheel the halves of which are relatively adjustable about the axis of the wheel, and a double sprocket chain for engaging the halves of said double sprocket wheel.

23. A machine for making a receptacle or container having sides of different sizes, comprising a multiple stapler head forming a gang stapler mechanism, power operated instrumentalities for automatically presenting the container sides successively to said mechanism, means for operating said mechanism to simultaneously drive the maximum number of staples into a relatively large side, and automatic devices for rendering one or more staplers of said gang inoperative to drive staples in a smaller side, said instrumentalities comprising a rotary basket form, a sprocket chain connection for rotating said basket form, and an intermittent motion device for operating said sprocket chain connection.

24. A machine for making a receptacle or container having sides of different sizes, comprising a multiple stapler head forming a gang stapler mechanism, power operated instrumentalities for automatically presenting the container sides successively to said mechanism, means for operating said mechanism to simultaneously drive the maximum number of staples into a relatively large side, and automatic devices for rendering one or more staplers of said gang inoperative to drive staples in a smaller side, said instrumentalities comprising a rotary basket form below said mechanism, said basket form having a clamp thereon to grip the end portion of an outside basket hoop strip, a hoop-strip guide pivoted adjacent said mechanism, in position to feed a hoop strip into position to be gripped by said clamp, and means for tilting said guide downward to engage the clamp and thereby cause the initial clamping of the hoop strip, together with means acting thereafter to hold said clamp in gripping position during the rotation of the basket form.

25. A machine for making a receptacle or container having sides of different sizes, comprising a multiple stapler head forming a gang stapler mechanism, power operated instrumentalities for automatically presenting the container sides successively to said mechanism, means for operating said mechanism to simultaneously drive the maximum number of staples into a relatively large side, and automatic devices for rendering one or more staplers of said gang inoperative to drive staples in a smaller side, said instrumentalities comprising a rotary basket form, a vertically reciprocating slide on which said basket form is mounted to rotate, and power-transmitting connections for rotating said basket form and adapted for accommodation to the up and down motion of said slide and basket form.

26. In a stapling machine, the combination of a gang stapler mechanism comprising a plurality of individual staplers operative in unison, disposed in a row, instrumentalities for supporting the work in position to move below said mechanism, by motion of said instrumentalities in the plane of said row, means for operating said mechanism, and devices automatically operated in the operation of said instrumentalities to automatically render one or more of said staplers inoperative to drive staples for certain portions of the work, said instrumentalities comprising a rotary basket form mounted in position to rotate below said mechanism about an axis extending at right angles to said plane, together with means for moving said basket form up and down, said form being oblong and rectangular in shape, thereby necessitating said up and down movement in order to present each side of the basket in proper position to receive the staples.

Specification signed this twenty-seventh day of July, 1929.

WALTER F. NEWHOUSE.